United States Patent
Ning et al.

(10) Patent No.: US 9,191,825 B2
(45) Date of Patent: Nov. 17, 2015

(54) METHOD AND SYSTEM FOR PHYSICAL RESOURCES CONFIGURATION AND SIGNAL TRANSMISSION WHEN COMMUNICATION SYSTEMS COEXIST

(75) Inventors: Ding Ning, Shenzhen (CN); Yanfeng Guan, Shenzhen (CN); Huiying Fang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 620 days.

(21) Appl. No.: 13/639,023

(22) PCT Filed: Nov. 1, 2010

(86) PCT No.: PCT/CN2010/078283
§ 371 (c)(1),
(2), (4) Date: Oct. 2, 2012

(87) PCT Pub. No.: WO2012/027924
PCT Pub. Date: Mar. 8, 2012

(65) Prior Publication Data
US 2013/0028151 A1    Jan. 31, 2013

(30) Foreign Application Priority Data

Aug. 30, 2010  (CN) .......................... 2010 1 0268337

(51) Int. Cl.
*H04W 16/14*   (2009.01)
*H04B 7/26*   (2006.01)
(Continued)

(52) U.S. Cl.
CPC ............. *H04W 16/14* (2013.01); *H04B 7/2643* (2013.01); *H04L 5/14* (2013.01); *H04L 27/2602* (2013.01)

(58) Field of Classification Search
None
See application file for complete search history.

(56) References Cited

U.S. PATENT DOCUMENTS 8,908,571 B2 * 12/2014 Hart ..................... H04J 11/0023
370/280
9,030,971 B2 * 5/2015 Linsky .............. H04W 72/1215
370/280
(Continued)

FOREIGN PATENT DOCUMENTS

CN    101483511 A    7/2009
CN    101686465 A    3/2010
(Continued)

OTHER PUBLICATIONS

"Requirements for WiMAX Coexistence with LTE Network", WMF-T31-132-v01, WiMAX forum, 2011.*
(Continued)

*Primary Examiner* — Ayaz Sheikh
*Assistant Examiner* — Faiyazkhan Ghafoerkhan
(74) *Attorney, Agent, or Firm* — IPLM Group, P.A.

(57) ABSTRACT

A method and system for configuring physical resource and signal transmission when communication systems coexist are provided. The method includes: configuring physical resources of the Wimax 16e frame according to LTE frame configuration information by following modes: configuring the number of downlink symbols in the Wimax 16e frame and shift time of the Wimax 16e frame relative to the half frame of the LTE frame according to the condition that the downlink region of the Wimax 16e frame is included in the downlink region of the LTE frame in time domain; and configuring the number of uplink symbols and time length of Transmission/Receive Transition Gap (TTG) in the Wimax 16e frame according to the condition that the uplink region of the Wimax 16e frame is included in the uplink region of the LTE frame in time domain; wherein, the uplink and downlink handover period of LTE frame is 5 ms.

16 Claims, 5 Drawing Sheets

(51) Int. Cl.
*H04L 5/14* (2006.01)
*H04L 27/26* (2006.01)

(56) References Cited

U.S. PATENT DOCUMENTS

| | | | | |
|---|---|---|---|---|
| 2008/0107047 | A1* | 5/2008 | Olfat | H04W 16/02 370/280 |
| 2008/0112361 | A1* | 5/2008 | Wu | H04W 16/14 370/330 |
| 2008/0144612 | A1* | 6/2008 | Honkasalo | H04L 12/66 370/370 |
| 2009/0067377 | A1* | 3/2009 | Talukdar | H04L 5/0048 370/329 |
| 2009/0122771 | A1* | 5/2009 | Cai | H04J 11/00 370/338 |
| 2010/0002608 | A1* | 1/2010 | Goldhamer | H04B 7/026 370/280 |
| 2010/0041341 | A1* | 2/2010 | Stratford | H04L 5/14 455/67.14 |
| 2010/0135272 | A1* | 6/2010 | Dayal | H04W 88/10 370/343 |
| 2010/0203832 | A1* | 8/2010 | Russell | H04B 1/525 455/41.2 |
| 2010/0240312 | A1* | 9/2010 | Peng | H04W 36/385 455/436 |
| 2010/0267386 | A1* | 10/2010 | Lim | H04W 36/385 455/436 |
| 2010/0290369 | A1* | 11/2010 | Hui | H04B 7/2656 370/279 |
| 2011/0013613 | A1* | 1/2011 | Sung | H04L 1/1887 370/338 |
| 2011/0013720 | A1* | 1/2011 | Lee | H04J 3/0682 375/295 |
| 2011/0032853 | A1* | 2/2011 | Moon | H04L 5/1484 370/280 |
| 2011/0032855 | A1* | 2/2011 | Kim | H04L 5/0037 370/294 |
| 2011/0044215 | A1* | 2/2011 | Kim | H04B 7/2656 370/280 |
| 2011/0103494 | A1* | 5/2011 | Ahmadi | H04L 5/0007 375/260 |
| 2011/0128893 | A1* | 6/2011 | Park | H04B 7/155 370/279 |
| 2011/0205986 | A1* | 8/2011 | Medapalli | H04W 72/1215 370/329 |
| 2012/0020256 | A1* | 1/2012 | Tujkovic | H04W 16/14 370/278 |
| 2012/0082038 | A1* | 4/2012 | Xu | H04L 11/0023 370/244 |
| 2012/0120944 | A1* | 5/2012 | Yang | H04L 7/04 370/350 |
| 2012/0147793 | A1* | 6/2012 | Chen | H04W 16/14 370/280 |
| 2012/0170506 | A1* | 7/2012 | Chun | H04B 7/155 370/315 |

FOREIGN PATENT DOCUMENTS

| | | |
|---|---|---|
| CN | 101841906 A | 9/2010 |
| WO | 2009131396 A2 | 10/2009 |
| WO | 2010056925 A1 | 5/2010 |

OTHER PUBLICATIONS

"The Next Step in the WiMAX Migration Path WiMAX 16e-Enhanced", Jun. 2010.*
Performance of IEEE802.16 Random Access Protocol—Steady State Queueing Analysis, Jun-Bae Seo, 2006.*
"IEEE802.16/WiMAX-Based Broadband Wireless Networks: Protocol Engineering, Applications, and Services", Ekram Hossain, 2007.*
International Search Report from corresponding PCT application PCT/CN2010/078283, mailed Jun. 9, 2011 (with English translation).

* cited by examiner

METHOD AND SYSTEM FOR PHYSICAL RESOURCES CONFIGURATION AND SIGNAL TRANSMISSION WHEN COMMUNICATION SYSTEMS COEXIST

TECHNICAL FIELD

The present invention relates to the field of communications, and in particular, to a method and system for resource configuration and signal transmission when communication systems coexist.

BACKGROUND OF THE RELATED ART

In a wireless communication system, a base station refers to a device providing functions such as initial access, service transmission and resource management etc. to a terminal, and typically, the base station implements the above functions by channel control and message management. The base station communicates with the terminal through an uplink and downlink, wherein, the downlink refers to a wireless link from the base station to the terminal, and the uplink refers to a wireless link from the terminal to the base station.

The Orthogonal Frequency Division Multiplexing (OFDM for short) technology is a high speed transmission technology under a wireless environment, which enhances the performance of anti-multipath fading by expanding a pulse width of symbols. The implementation principle of the OFDM technology is that the high speed serial data is transformed into multi-path parallel data with a relatively low speed, and the multi-path parallel data are modulated onto sub-carriers which are orthogonal with each other for transmission. The Orthogonal Frequency Division Multiple Access (OFDMA for short) technology is to implement multiple access by enabling users to occupy different sub-carriers on the basis of the OFDM technology. In a wireless communication system using the OFDMA technology, the base station implements mapping of radio resources and allocation of radio resources. For example, the base station determines a system configuration and resource allocation information for the downlink transmission from the base station to the terminal and the system configuration and resource allocation information for the uplink transmission from the terminal to the base station and so on, the base station transmits the system configurations and resource allocation information to the terminal through a control channel, and the terminal receives these information on the determined control channel, and then receives and transmits data to communicate with the base station. In order to maintain timing synchronization when the base station communicates with the terminal, the base station needs to transmit a synchronization signal, which is referred to as a preamble or a preambl or a synchronization sequence in some communication standards, to the terminal in a downlink area.

In addition, in order to adapt various channel conditions, one kind of wireless communication system has multiple frame structures, and how to ensure consistence of the designs of control channels under a condition of multiple frame structures includes whether the locations and numbers of resources for transmitting the control channels are consistent; in the same generation of communication standards, multiple communication systems coexist, and how to design respective control channels to ensure that various communication systems can coexist is also very important; and in the process of the development of one communication system, a previous generation system thereof typically needs to be supported in the evolved system, for example, the IEEE 802.16m system is an evolved system for the IEEE 802.16e system, and the IEEE 802.16e is a previous generation system for the IEEE 802.16m, and therefore, supporting the previous generation system also limits the method for designing the control channels of the evolved system.

Another name of the Worldwide Interoperability for Microwave Access (Wimax) 16e is 802.16. Wimax 16e is an emerging broadband wireless access technology, and can provide an Internet oriented high speed connection. Wherein, IEEE 802.16e is a standard of the mobile broadband wireless access, and the Wimax 16e system refers to a communication system based on the IEEE 802.16e standard. The Wimax 16e communication system can be divided into two kinds of modes, i.e., a Partial Usage of Sub-Channel (PUSC) and a Full Usage of Sub-Channel (FUSC) according to a frequency band dividing mode. The PUSC refers to dividing the frequency bands into three sectors, and the FUSC refers to not dividing the frequency bands into sectors, and instead, combining the frequency bands for use. The resources of the Wimax 16e system can have multiple modes such as PUSC, FUSC, Adaptive Modulation and Coding (AMC) etc. in accordance with structures. Wherein, the AMC mode can have multiple modes, including a total of four structures occupying 1, 2, 3 and 6 symbols in time domain.

For the downlink part of the Wimax 16e system, there must be a preamble of one symbol and PUSC resources in units of 2 symbols, and this part of PUSC resources are used to transmit a system control signaling, and the remaining part can be comprised of one or more of various resource blocks such as PUSC, FUSC, AMC etc., i.e., the downlink resources must include a preamble and PUSC resources. For the uplink part, it is comprised of one or two of PUSC and AMC, i.e., the uplink can operate as long as there is one of PUSC and AMC.

The Long Term Evolution (LTE) project is a 3G evolution, and is dated from 3GPP conference in Toronto in 2004. The LTE is a transition between 3G and 4G, and is a global standard of 3.9G, which improves and enhances the air access technology of 3G, and uses OFDM and MIMO as the unique standard for the evolution of the wireless network thereof. The frame structure of the LTE communication system is comprised of data frames of 10 ms, wherein, each frame has 10 subframes, which can further be divided into two half frames of 5 ms, and each of which is comprised of a certain number of uplink symbols, downlink symbols or Guard Periods (GPs). A handover period can be divided into 5 ms and 10 ms according to uplink and downlink.

One frame structure for a 10 ms handover of the LTE communication system is shown in FIG. 1A, one frame with a time length of 10 ms (referred to as LTE frame herein) has one particular subframe S, where a Downlink Pilot Time Slot (DwPTS) is a downlink part in the particular subframe, and is used to transmit downlink symbols, and an Uplink Pilot Time Slot (UpPTS) is an uplink part in the particular subframe, and is used to transmit downlink signals, and a GP is a blank part in the particular subframe, which does not transmit any signal.

The structure of the configured frame for a handover period of 5 ms of the LTE communication system is shown in FIG. 1B, and the difference from the frame structure for the 10 ms handover is that there is one particular subframe S every time length of 5 ms, and there are two particular subframes S in one radio frame with a time length of 10 ms. In the present application, all downlink subframes and the DwPTS constitute the downlink area in the LTE frame, and all uplink subframes and the UpPTS constitute the uplink area of the LTE frame.

There are two kinds of OFDM symbols for the LTE system, one of which is a regular cyclic prefix and the other is a normal cyclic prefix, wherein, the lengths of the two symbols are different in time.

Both the Wimax 16e communication system and the LTE communication system can be divided into a Time Division Duplex (TDD for short) system and a Frequency Division Duplex (FDD for short) system. In the TDD system, for the wireless communication system based on OFDM or OFDMA, the mapping of radio resources thereof is primarily based on the frame structure and resource structure of the wireless communication system, and the frame structure describes the control structure of the radio resource in time domain, and the resource structure describes the control structure of the radio resource in frequency domain. The frame structure divides the radio resources into different levels of units in time domain, such as superframes, frames, subframes and symbols, and implements scheduling control by setting different control channels (such as broadcast channels, unicast and multicast channels etc.). Each superframe, frame, subframe and symbol occupy a certain time in time domain. In the TDD mode of the Wimax 16e communication system, as shown in FIG. 2, a frame length of one Wimax 16e frame is 5 ms, including a downlink area, an uplink area, an idle time period, which is referred to as a Transmission/Receive Transition Gap (TTG for short), between the downlink area and the uplink area, and an idle time period, which is referred to as a Receive/Transmission Transition Gap (RTG for short), between the uplink area and the downlink area. On the time slot of the TTG and the RTG, the terminal and the base station do not transmit any signal.

In the communication system, there may be a condition that the distance between central frequency points of the frequency bands used by two communication systems is rather near and the interval between two frequency bands is small or almost 0, and in such condition, there may be serious interference between the two communication systems, and the two communication systems in such condition are referred to as adjacent frequency communication systems. As shown in FIG. 3, the first communication system and the second communication system are two adjacent frequency communication systems, and the first communication system will produce energy leakage of the frequency band, and leaks a part of energy on the frequency band of the second communication system, which produces a large interference to the communication of the second communication system. Likewise, the second communication system will also produce interference to A. Especially when the second communication system performs uplink communication but the first communication system performs downlink communication at the same time, a terminal belonging to the second communication system will transmit uplink data to the base station, and at this time, a signal transmitted by the terminal of the second communication system will produce a large energy leakage of the frequency band and the energy is added to an antenna of a terminal of the first communication system, which produces a large interference to the reception of the downlink signal by the terminal of the first communication system, that is, the downlink signal of the first communication system and the uplink signal of the second communication system will interference the reception of the signal by the other party, vice versa. When considering adjacent frequency coexistence while two communication systems coexist (refers to the base stations of the two communication systems are located at the same place), the above interference problem will become more serious.

SUMMARY OF THE INVENTION

The present invention provides a method and system for configuring physical resource when communication systems coexist, to overcome mutual interference when a LTE system and a Wimax 16e system are of adjacent frequency coexistence.

In order to overcome the above problem, the present invention provides a method for configuring physical resource when communication systems coexist, wherein, the method is applied to a situation of adjacent frequency coexistence of a World-wide Interoperability for Microwave Access (Wimax) system and a Long Term Evolution (LTE) system and both systems using a Time Division Duplex (TDD) mode, comprising: configuring physical resources of a Wimax 16e frame according to configuration information of a LTE frame by the following modes:

configuring a number of downlink symbols in the Wimax 16e frame and shift time of an initial location of the Wimax 16e frame relative to an initial location of a half frame of the LTE frame according to a constraint condition that a downlink area of the Wimax 16e frame is included in a downlink area of the LTE frame in time domain;

configuring a number of uplink symbols and a time length of a Transmission/Receive Transition Gap (TTG) in the Wimax 16e frame according to a constraint condition that an uplink area of the Wimax 16e frame is included in an uplink area of the LTE frame in time domain, wherein, a handover period of the LTE frame is 5 ms.

The present invention further provides a system for configuring physical resource of a Wimax 16e base station when communication systems coexist, wherein, the Wimax 16e base station and a LTE base station are of adjacent frequency coexistence and both base stations use a TDD mode, an uplink and downlink handover period of a LTE frame configured by the LTE base station is 5 ms, and the system for configuring physical resource comprises:

a first configuration apparatus, configured to configure a number of downlink symbols in a Wimax 16e frame and shift time of an initial location of the Wimax 16e frame relative to an initial location of a half frame of the LTE frame according to a constraint condition that a downlink area of the Wimax 16e frame is included in a downlink area of the LTE frame in time domain;

a second configuration apparatus, configured to configure a number of uplink symbols and a time length of a Transmission/Receive Transition Gap (TTG) in the Wimax 16e frame according to a constraint condition that an uplink area of the Wimax 16e frame is included in an uplink area of the LTE frame in time domain. With the above method and system for configuring physical resource, the uplink and downlink areas of the Wimax 16e frame transmitted by the Wimax 16e are made to be included in the uplink and downlink areas of the LTE frame transmitted by the LTE base station which is of adjacent frequency coexistence with the Wimax 16e respectively in time domain, which solves the problem of mutual interference when there is adjacent frequency coexistence between the LTE system and the Wimax 16e system and enhances the performance of the communication systems, thus implementing reliable communication of the communication systems.

The present invention further provides a method for signal transmission when communication systems coexist, which can overcome mutual interference when there is adjacent frequency coexistence of the LTE system and the Wimax 16e system.

The present invention further provides a method for signal transmission when communication systems coexist, which is applied to a situation of adjacent frequency coexistence between a Wimax 16e base station and a LTE base station and both base stations using a TDD mode, wherein, an uplink and downlink handover period of a LTE frame configured by the LTE base station is 5 ms, and the method for signal transmission comprises:

the Wimax 16e base station transmitting a downlink signal on a downlink area of a Wimax 16e frame, and transmitting an uplink signal on an uplink area of the Wimax 16e frame;

the downlink area of the Wimax 16e frame being included in a downlink area of a LTE frame in time domain, and the uplink area of the Wimax 16e frame being included in an uplink area of the LTE frame in time domain. With the above method for signal transmission, the uplink and downlink areas of the Wimax 16e frame transmitted by the Wimax 16e are made to be included in the uplink and downlink areas of the LTE frame transmitted by the LTE base station which is of adjacent frequency coexistence with the Wimax 16e respectively in time domain, which solves the problem of mutual interference when there is adjacent frequency coexistence between the LTE system and the Wimax 16e system and enhances the performance of the communication systems, thus implementing reliable communication of the communication systems.

BRIEF DESCRIPTION OF DRAWINGS

The accompanying drawings illustrated here are used to provide further understanding of the present invention and constitute a part of the present application, and the illustrative embodiments of the present invention and the description thereof are used to explain the present invention, and do not constitute improper definition of the present invention. In the accompanying drawings.

PREFERRED EMBODIMENTS OF THE PRESENT INVENTION

Figure 1A:
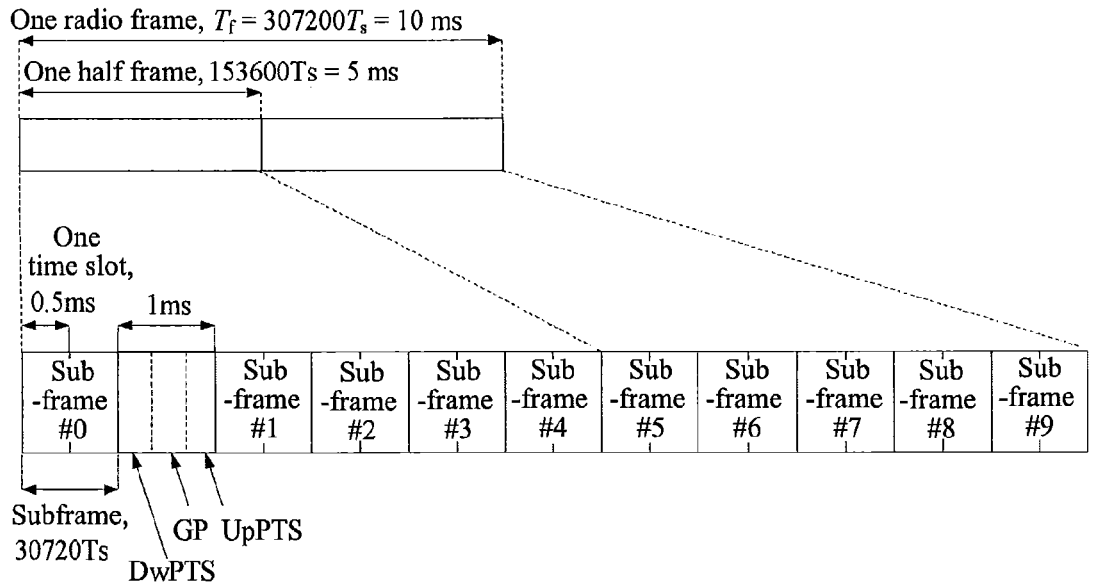
FIGS. 1A and 1B are diagrams of one frame structure for a 10 ms handover and a 5 ms handover of a LTE communication system according to related art respectively.
Figure 1B:
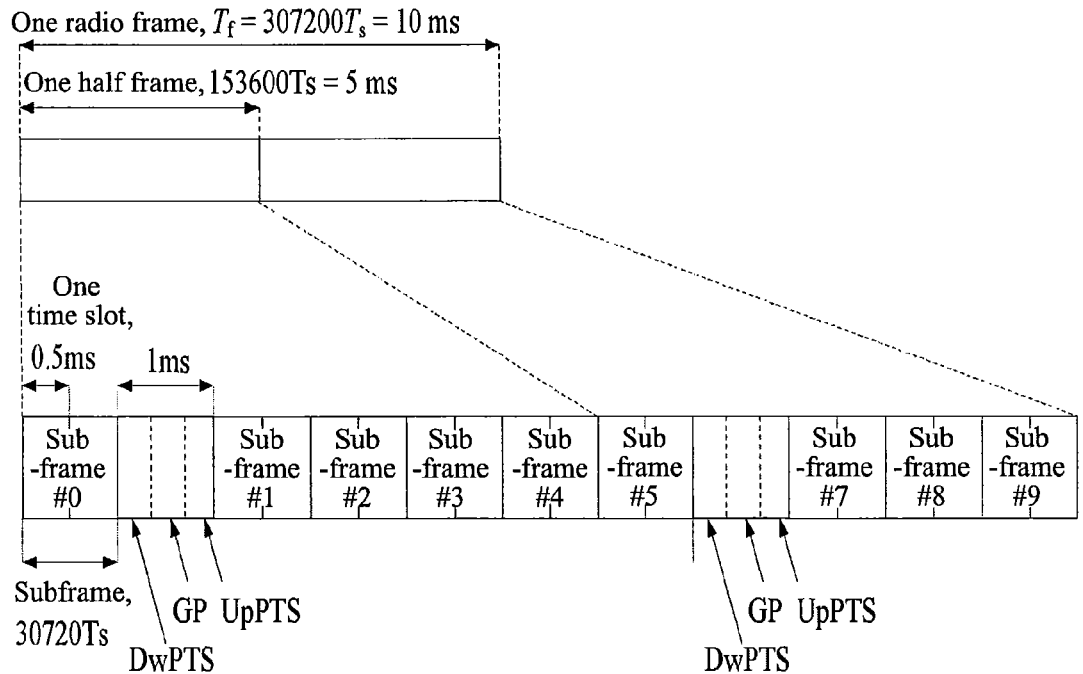
Figure 2:
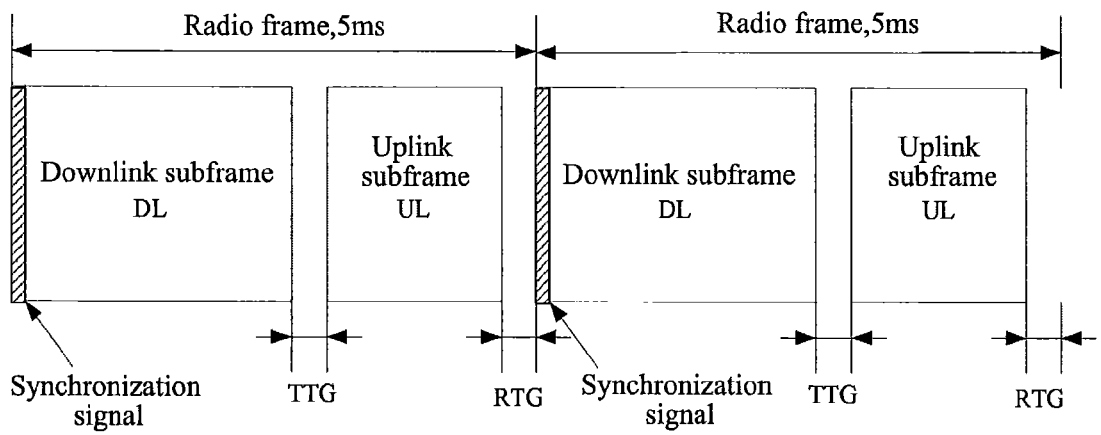
FIG. 2 is a diagram of one frame structure of a Wimax 16e system according to related art.
Figure 3:
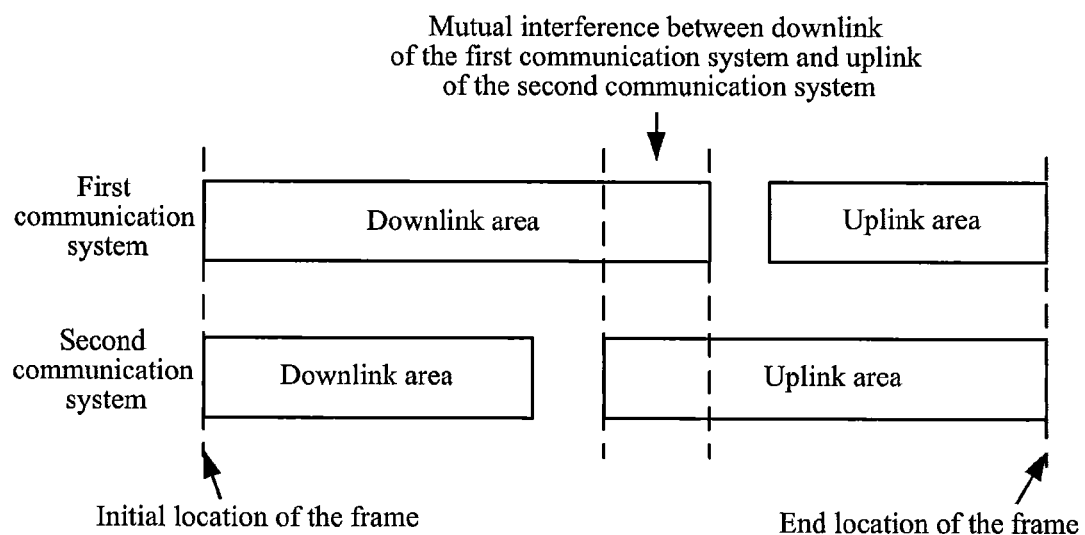
FIG. 3 is a diagram of mutual interference when two adjacent frequency systems coexist according to related art.

The embodiments of the present invention will be described in detail in conjunction with accompanying drawings hereinafter. It should be illustrated that the embodiments in the present application and the features thereof can be combined with each other without conflict.

Embodiment One

In the present embodiment, the first communication system and the second communication system are of adjacent frequency coexistence and use a TDD mode, the first communication system needs not to be changed, and physical resources of the second communication system frame need to be configured according to frame configuration information of the first communication system, which comprises:

configuring related parameters of a downlink area of the second communication system frame, so that the downlink area of the second communication system frame is included in a downlink area of the first communication system in time domain; and configuring related parameters of an uplink area of the second communication system frame, so that the uplink area of the second communication system frame is included in an uplink area of the first communication system in time domain.

Specifically, the physical resources of the base station of the first communication system can be configured by the base station of the first communication system according to frame configuration information of a base station of the second communication system which is of adjacent frequency coexistence and clock synchronization with the base station of the first communication system. The configuration can be a static configuration, or can also be a non-static configuration such as a semi-static configuration or a dynamic configuration.

The above "is included in time domain" includes a situation that two areas are completely overlapped in time domain.

In order to satisfy the above inclusion relationship in time domain, a difference between time lengths of the uplink areas of the two communication system frames should be less than the first specified time length, and a difference between time lengths of the downlink areas of the two communication system frames should be less than the second specified time length, wherein, the first specified time length and the second specified time length are larger than or equal to 0, and under a premise of satisfying related requirements of the first communication system and the second communication system, the different between the time lengths should be as small as possible. In specific implementation, the above requirements on the time lengths can be achieved by adjusting the numbers of the uplink symbols and the downlink symbols in the second communication system frame, for example, the number of the uplink symbols may be increased and meanwhile the number of the downlink symbols is reduced.

In order to satisfy the above inclusion relationship in time domain, relative locations between the uplink areas and the downlink areas of the two communication system frames need to be configured, for example, configuring shift time of an initial location of the second communication system frame relative to an initial location of the first communication system frame etc.

Figure 4:
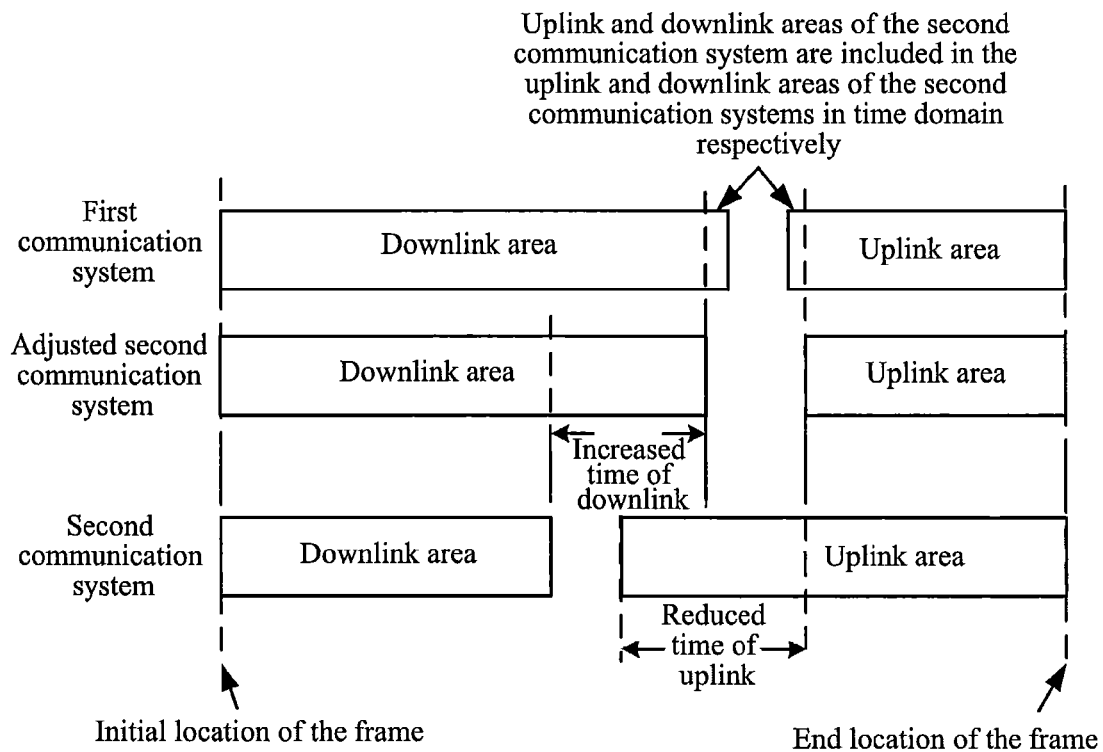
FIG. 4 is a diagram of reducing mutual interference by changing uplink and downlink areas of a second communication system according to embodiment one of the present invention.

After the configuration is complete, when the base station of the second communication system transmits a downlink signal in the downlink area, the base station of the first communication system which is of adjacent frequency coexistence therewith does not transmit an uplink signal; and when the base station of the second communication system transmits an uplink signal in the uplink area, the base station of the first communication system which is of adjacent frequency coexistence therewith does not transmit a downlink signal. Therefore, the adjacent frequency interference will be small. As shown in FIG. 4, before using the method according to the present embodiment, the downlink area of the first communication system and the uplink area of the second communication system are overlapped, and will transmit data at the same time, thus producing a large interference. After the second communication system is amended, which makes the downlink area of the second communication system frame included in the downlink area of the first communication system frame in time domain and the uplink area of the second communication system frame also included in the uplink area of the first communication system frame in time domain, the problem of interference is largely reduced.

Embodiment Two

The present embodiment is based on the embodiment one, and the first communication system is a LTE system using the TDD mode, including subsequent evolved systems of the LTE, such as LTE-Advance etc.; and the second communication system is a Wimax 16e system using the TDD mode. When the LTE system and the Wimax 16e system are of adjacent frequency coexistence, they interfere with each other.

There are seven types of uplink and downlink configurations for the LTE, which are numbered with 0-6, and are denoted as 0# uplink and downlink configuration~6# uplink and downlink configuration. In the uplink and downlink configuration table (table 1) below, D represents a downlink subframe, which is with a length of 1 ms and is used to transmit a downlink signal; U represents an uplink subframe, which is with a length of 1 ms and is used to transmit an uplink signal; and S represents a particular subframe, which is with a length of 1 ms and includes a Downlink Pilot Time Slot (DwPTS), a Guard Period (GP), and an Uplink Pilot Time Slot (UpPTS) in sequence. Wherein, all the uplink subframes and the UpPTS in the LTE frame constitute an uplink area of the LTE frame, and all downlink subframes and the DwPTS in the LTE frame constitute a downlink area of the LTE frame.

TABLE 1

| Uplink and downlink configurations | Uplink and downlink handover periods | Numbers of subframes | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

It can be seen from table 1 that uplink and downlink handover periods of the 0#, 1#, 2# and 6# uplink and downlink configurations are 5 ms, and structures of two half frames are the same, both of which includes one particular subframe. The uplink and downlink handover periods of the 3#, 4# and 5# uplink and downlink configurations are 10 ms, which include one particular subframe in the first half frame and have no particular subframe in the second half frame.

The proportion between the UpPTS, DwPTS and GP in the particular subframe can also be adjusted, and there are 9 types of frame configurations of the particular subframe, which are numbered with 0-8, and denoted as 0#~8# frame configurations of the particular frame. As shown in the following frame configuration table (table 2) of the particular subframe, the time occupied by the UpPTS, DwPTS and GP can be different under different frame configurations of the particular subframe, and table 2 merely indicates the time of UpPTS and DwPTS, and the time of the GP is obtained by subtracting the time of the UpPTS and DwPTS from 1 ms.

TABLE 2

| Frame configurations of a particular subframe | When a regular cyclic prefix is for the downlink | | | When an extended cyclic prefix is for the downlink | | |
|---|---|---|---|---|---|---|
| | | UpPTS | | | UpPTS | |
| | DwPTS | When a regular cyclic prefix is for the uplink is | When an extended cyclic prefix is for the uplink is | DwPTS | When a regular cyclic prefix is for the uplink | When an extended cyclic prefix is for the uplink |
| 0 | 214.58 us | 71.35 us | 83.33 us | 250 us | 71.35 us | 83.33 us |
| 1 | 643.23 us | | | 666.67 us | | |
| 2 | 714.58 us | | | 750 us | | |
| 3 | 785.94 us | | | 833.33 us | | |
| 4 | 857.29 us | | | 250 us | 142.71 us | 166.67 us |
| 5 | 214.58 us | 142.71 us | 166.67 us | 666.67 us | | |
| 6 | 643.23 us | | | 750 us | | |
| 7 | 714.58 us | | | — | — | — |
| 8 | 785.94 us | | | — | — | — |

The embodiment relates to a situation that the uplink and downlink handover periods of the LTE frame are 5 ms, and at this time, the LTE frame uses 0#, 1#, 2# and 6# uplink and downlink configurations. In order to reduce the mutual interference between the LTE base station and the Wimax 16e base station which are of adjacent frequency coexistence, there is no need to change the frame structure of the Wimax 16e frame, and it is only needed to configure the physical resources of the Wimax 16e frame according to the configuration information of the LTE frame, which comprises:

configuring a number of downlink symbols in the Wimax 16e frame and shift time of an initial location of the Wimax 16e frame relative to an initial location of a half frame of the LTE frame according to the limitation condition that a downlink area of the Wimax 16e frame is included in a downlink area of the LTE frame in time domain; and configuring a number of uplink symbols and a time length of a TTG in the Wimax 16e frame according to the limitation condition that an uplink area of the Wimax 16e frame is included in an uplink area of the LTE frame in time domain.

The above configuration can be a configuration made to the physical resources of the Wimax 16e frame of the Wimax 16e base station by the Wimax 16e base station itself according to the configuration information of the LTE frame of the LTE base station which is of adjacent frequency coexistence with the Wimax 16e base station, and the configuration information of the LTE frame includes uplink and downlink configuration information, frame configuration information of the particular subframe, and cyclic prefix type information.

The above configuration is a static configuration; or the above configuration is a non-static configuration, and at this time, after updating the configuration of the LTE frame, the LTE base station transmits the new configuration information of the LTE frame to be effective to the Wimax 16e base station which is of adjacent frequency coexistence with the LTE base station (for example, the configuration information can be transmitted to a Wimax 16e core network through a LTE core network firstly and then be transmitted to the Wimax 16e base station through the Wimax 16e core network), and the Wimax 16e base station re-performs the configuration according to the new configuration information of the LTE frame.

In order to satisfy the above limitation condition, preferably, when the number of downlink subframes in the first half frame of the LTE frame N≥2, shift time of an initial location of the Wimax 16e frame relative to an initial location of a half frame of the LTE frame is configured as (N−1)ms using a forward shift mode; or the shift time is configured as (6−N)ms using a backward shift mode, thus aligning the initial location of the Wimax 16e frame with the initial time of the second downlink subframe of the half frame of the LTE frame; and when N=1, the shift time is configured as 0, thus aligning the initial location of the Wimax 16e frame with the initial location of the half frame of the LTE frame.

In order to make the downlink area of the Wimax 16e frame be included in the downlink area of the LTE frame in time domain, a total time length of the all the downlink symbols in the Wimax 16e frame should be less than or equal to a time length of the downlink area of the first half frame of the LTE frame, which is referred to as the first condition hereinafter. When not all the downlink resources of the Wimax 16e frame are the PUSCs, the configured number of the downlink symbols in the Wimax 16e frame is less than or equal to a maximum integer satisfying the first condition, and when all the downlink resources of the Wimax 16e frame are the PUSCs, the configured number of the downlink symbols in the Wimax 16e frame is less than or equal to a maximum odd number satisfying the first condition.

When not considering the constraint on the number of the symbols by the resource type, the maximum number of symbols $M_{D.max}$ of the downlink symbols satisfying the first condition can be determined according to the following equation:

$$M_{D2.max} = \lfloor (T_{Ds.LTE} + T_{DwPTS})/T_{Symbol} \rfloor$$

Wherein, $T_{frame}$ is a frame length of the Wimax 16e frame, $T_{frame}=5$ ms; $T_{Symbol}$ is a time length of one symbol of the Wimax 16e frame, $T_{Symbol}=102.857$ us, but under some other Wimax system configurations, a value of $T_{Symbol}$ can be variable, and a corresponding maximum number of symbols, the TTG and the RTG also vary, are the same for the following equations, and will not be described further; $T_{Ds.LTE}$ is a total time length of all the downlink subframes in the first half frame of the LTE frame; and $T_{DwPTS}$ is a time length of the DwPTS in the half frame of the LTE frame; and $\lfloor \; \rfloor$ represents round down. Values of $T_{Ds.LTE}$ and $T_{DwPTS}$ are related to the uplink and downlink configuration, frame configuration of a particular subframe and cyclic prefix type of the LTE, and can be obtained by looking up table 1 and table 2.

When all the downlink resources of the Wimax 16e frame are PUSCs, a maximum number $M_D$ of the downlink symbols in the Wimax 16e frame is a maximum odd number which is less than or equal to $M_{D.max}$, and when not all the downlink resources of the Wimax 16e frame are PUSCs, $M_D = M_{D.max}$.

Preferably, in the present embodiment, the time length of the TTG is configured according to the requirements on the aligning of the initial location of the uplink area of the Wimax 16e frame with the initial location of the UpPTS in the half frame of the LTE frame.

For example, when using a forward shift mode, the time length $T_{TTG}$ of the TTG can be calculated according to the following equation:

$$T_{TTG}=T_{off\cdot UpPTS}+T_{off\cdot Wimax}-M_{D2}\cdot T_{symbol}$$

wherein, $T_{off\cdot UpPTS}$ is a time length from the initial location of the UpPTS in the half frame of the LTE frame to the initial location of the half frame of the LTE frame; $T_{off\cdot Wimax}$ is shift time of an initial location of the Wimax 16e frame relative to an initial location of a half frame of a LTE frame, and takes a positive value according to the forward shift mode; $M_{D2}$ is a symbol number of downlink symbols in the Wimax 16e frame; and $T_{symbol}$ is a time length of one symbol of the Wimax 16e system.

If $T_{off\cdot Wimax}$ takes a positive value according to a backward shift mode, the above equation can be varied as:

$$T_{TTG}=T_{off\cdot UpPTS}+T_{frame}-T_{off\cdot Wimax}-M_{D2}\cdot T_{symbol}$$

wherein, $T_{frame}$=5 ms.

Figure 6:
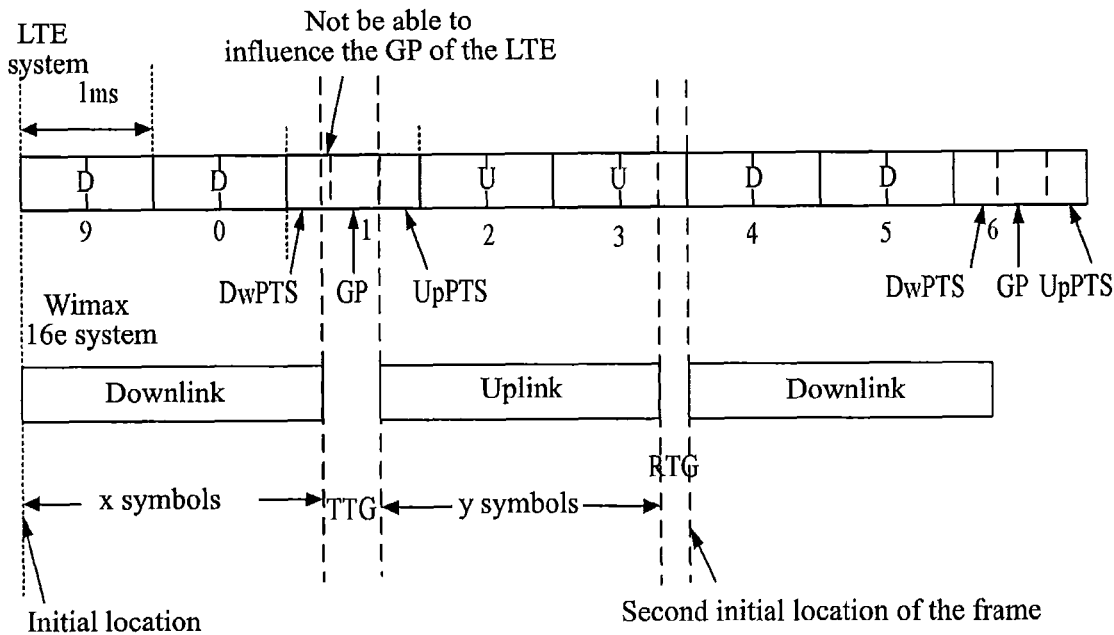
FIG. 6 is a diagram of frame configurations of two systems when a LTE base station and a Wimax 16e base station are of adjacent frequency coexistence and use 1# uplink and downlink configuration according to example two of embodiment two.

It can be seen from FIG. 6 that the time length of the TTG is larger than or equal to GP, and the end locations of the both are aligned.

In order to make the uplink area of the Wimax 16e frame be included in the downlink area of the LTE frame in time domain, a sum of a total time length of all the uplink symbols in the Wimax 16e frame and a minimum time length of the RTG is less than or equal to a time length of the uplink area of the second half frame of the LTE frame, which is referred to as the second condition hereinafter. When not all the uplink resources of the Wimax 16e frame are the PUSCs, the configured number of the uplink symbols in the Wimax 16e frame is less than or equal to a maximum integer satisfying the second condition, and when all the uplink resources of the Wimax 16e frame are the PUSCs, the configured number of the uplink symbols in the Wimax 16e frame is less than or equal to a maximum integer satisfying the second condition and being a multiple of 3.

When not considering the constraint on the number of the symbols by the resource type, the maximum number of uplink symbols $M_{U\cdot max}$ of the Wimax 16e frame satisfying the second condition can be determined according to the following equation:

$$M_{U\cdot max}=\lfloor(T_{Us\cdot LTE}+T_{UpPTS}-T_{RTG})/T_{Symbol}\rfloor$$

wherein, the meaning of $T_{Symbol}$ is the same as the above; $T_{Us\cdot LTE}$ is a total time length of all the uplink subframes in the second half frame of the LTE frame; $T_{UpPTS}$ is a time length of UpPTS in the half frame of the LTE frame; $T_{RTG}$ is a minimum time length of the RTG required by the Wimax 16e system, and $T_{RTG}$=80 us~100 us; and $\lfloor\ \rfloor$ represents round down. Values of $T_{Us\cdot LTE}$ and $T_{UpPTS}$ are related to the uplink and downlink configuration, frame configuration of a particular subframe and cyclic prefix type of the LTE, and can be obtained by looking up table 1 and table 2.

When not all the uplink resources of the Wimax 16e frame are PUSCs, a maximum number of the uplink symbols in the Wimax 16e frame $M_U=M_{U\cdot max}$, and when all the uplink resources of the Wimax 16e frame are PUSCs, the maximum number $M_U$ of the uplink symbols in the Wimax 16e frame is a maximum integer being less than or equal to $M_{U\cdot max}$ and being a multiple of 3.

After determining both the numbers of uplink and downlink symbols and the time length of the TTG, the time length of the RTG in the Wimax 16e frame can also be finally determined.

With respect to FIGS. 5, 6, 7 and 8, according to the above configurations, when the LTE frame uses the 0#, 1#, 2# and 6# uplink and downlink configurations, the uplink and downlink areas of the Wimax 16e frame are included in the uplink and downlink areas of the LTE frame in time domain respectively.

For the coexistence of the Wimax 16e system and the LTE system, there are multiple resource types for the Wimax 16e system, and the numbers of the time domain symbols occupied by different resource types are different. Under the premise of satisfying the constraint conditions of the inclusion relationship between the uplink and downlink areas and the association relationship between the resource types and the numbers of symbols for the Wimax 16e system, the above method maximizes the numbers of the uplink and downlink symbols, which largely reduces the mutual interference between the LTE system and the Wimax 16e system which are of adjacent frequency coexistence and can also enhance the availability of the resources of the Wimax 16e system.

Based on the above method for physical resource configuration, the present embodiment further provides a method for signal transmission when communication systems coexist, which is applied to a situation of adjacent frequency coexistence of a Wimax 16e base station and a LTE base station and both base stations using a TDD mode, wherein, the uplink and downlink handover periods of the LTE frame configured by the LTE base station are 5 ms, and the method for signal transmission comprises:

the Wimax 16e base station transmitting a downlink signal on a downlink area of a Wimax 16e frame, and transmitting an uplink signal on an uplink area of the Wimax 16e frame;

the downlink area of the Wimax 16e frame being included in a downlink area of the LTE frame in time domain, and the uplink area of the Wimax 16e frame being included in an uplink area of the LTE frame in time domain.

Preferably, when transmitting a downlink signal in a downlink area of the Wimax 16e frame, the Wimax 16e base station transmits the first synchronization signal on the first downlink symbol, starts to transmit a system control signaling from the second downlink symbol, and transmits the second synchronization signal on a downlink symbol with a starting time being 5 ms later than starting time of the first downlink symbol.

Preferably, the Wimax 16e base station is clock synchronized with the LTE base station.

When the number of downlink subframes in the first half frame of the LTE frame N≥2, the starting time for the Wimax 16e base station to transmit the downlink signal on the downlink area of the Wimax 16e frame is aligned with starting time for the second downlink subframe in a half frame of the LTE frame; and when N=1, the starting time for the Wimax 16e base station to transmit the downlink signal on the downlink area of the Wimax 16e frame is aligned with starting time for a half frame of the LTE frame.

The starting time for the Wimax 16e base station to transmit the uplink signal on the uplink area of the Wimax 16e frame is aligned with starting time for an Uplink Pilot Time Slot (UpPTS) in the half frame of the LTE frame.

Preferably, the number of downlink symbols which can be used by the downlink area and the number of uplink symbols which can be used by the uplink area of the Wimax 16e frame are determined according to the frame configuration method of the present embodiment and the examples thereof.

Figure 9:
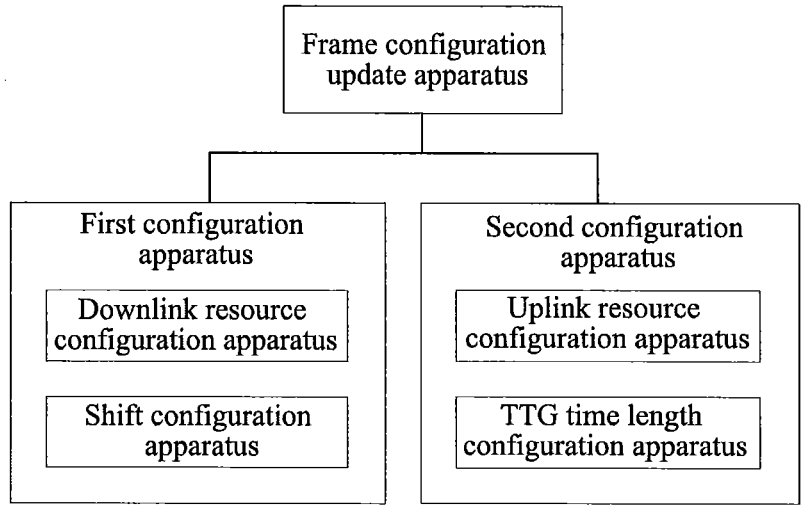
FIG. 9 is a block diagram of a structure of a system for physical resource configuration according to embodiment two of the present invention.

Correspondingly, as shown in FIG. 9, the present embodiment further provides a system for configuring physical resource of a Wimax 16e base station when communication systems coexist, wherein, the Wimax 16e base station and a LTE base station are of adjacent frequency coexistence and both use a TDD mode, an uplink and downlink handover period of a LTE frame configured by the LTE base station is 5 ms, and the system for configuring physical resource comprises:

a first configuration apparatus, configured to configure a number of downlink symbols in the Wimax 16e frame and shift time of an initial location of the Wimax 16e frame relative to an initial location of a half frame of the LTE frame according to a constraint condition that a downlink area of the Wimax 16e frame is included in a downlink area of the LTE frame in time domain; and a second configuration apparatus, configured to configure a number of uplink symbols and a time length of a TTG in the Wimax 16e frame according to a constraint condition that an uplink area of the Wimax 16e frame is included in an uplink area of the LTE frame in time domain.

Further, the first configuration apparatus comprises:

a shift configuration apparatus, configured to configure the shift time by the following modes: when a number of downlink subframes in a first half frame of the LTE frame N≥2, configuring the shift time as (N−1)ms using a forward shift mode; alternatively, configuring the shift time as (6−N)ms using a backward shift mode; and when N=1, configuring the shift time as 0; and a downlink resource configuration apparatus, configured to configure the number of the downlink symbols in the Wimax 16e frame, wherein, when not all the downlink resources of the Wimax 16e frame are PUSCs, the configured number of the downlink symbols in the Wimax 16e frame is less than or equal to a maximum integer satisfying a first condition, and when all the downlink resources of the Wimax 16e frame are the PUSCs, the configured number of the downlink symbols in the Wimax 16e frame is less than or equal to a maximum odd number satisfying the first condition, wherein, the first condition is that a total time length of all the downlink symbols in the Wimax 16e frame is less than or equal to a time length of the downlink area of the first half frame of the LTE frame.

Further, the second configuration apparatus comprises:

a TTG time length configuration apparatus, configured to configure the time length of the TTG as a difference value obtained by subtracting the time length of the downlink area of the Wimax 16e frame from a total time length of all the downlink subframes, a DwPTS and a GP in the first half frame of the LTE frame; and an uplink resource configuration apparatus, configured to configure the number of the uplink symbols in the Wimax 16e frame, wherein, when not all the uplink resources of the Wimax 16e frame are the PUSCs, the configured number of the uplink symbols in the Wimax 16e frame is less than or equal to a maximum integer satisfying a second condition, and when all the uplink resources of the Wimax 16e frame are the PUSCs, the configured number of the uplink symbols in the Wimax 16e frame is less than or equal to a maximum integer satisfying the second condition and being a multiple of 3, wherein, the second condition is that a sum of the total time length of all the uplink symbols in the Wimax 16e frame and a minimum time length of the RTG is less than or equal to the time length of the uplink area of the second half frame of the LTE frame.

Further, the configuration made by the first configuration apparatus and the second configuration apparatus on the physical resources of the Wimax 16e frame is performed to the physical resources of the Wimax 16e frame according to the uplink and downlink configuration information, frame configuration information of a particular subframe and cyclic prefix type information of the LTE frame of a LTE base station which is of adjacent frequency coexistence with the Wimax 16e base station; and the physical resource configuration system further comprises: a frame configuration update apparatus, configured to receive new configuration information of the LTE frame to be effective of the LTE base station after the LTE base station updates the configuration of the LTE frame, and notify the first configuration apparatus and the second configuration apparatus, so that the first configuration apparatus and the second configuration apparatus re-perform the configuration according to the new configuration information of the LTE frame.

Based on the scheme of embodiment two, the configuration of numbers of uplink and downlink symbols in the Wimax 16e frame under different uplink and downlink configurations of the LTE frame will be described below.

EXAMPLE ONE

Figure 5:
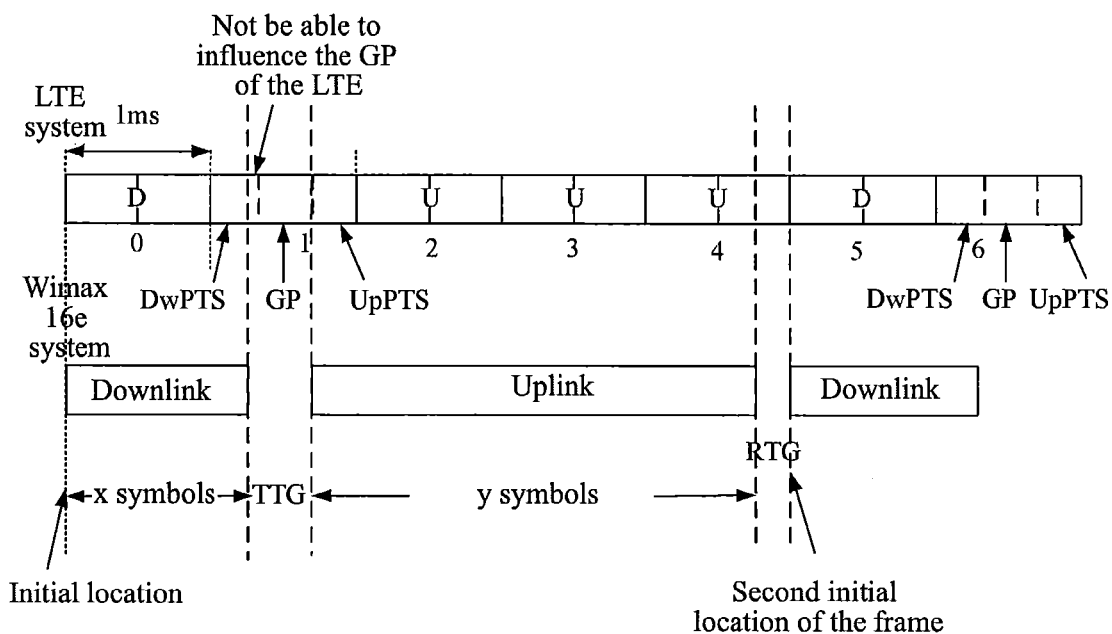
FIG. 5 is a diagram of frame configurations of two systems when a LTE base station and a Wimax 16e base station are of adjacent frequency coexistence and use 0# uplink and downlink configuration according to example one of embodiment two.

In the present example, the LTE base station uses 0# uplink and downlink configuration, an uplink and downlink subframe sequence in the LTE frame is DSUUUDSUUU, and structures of two half frames are the same. As shown in FIG. 5, an initial location of the Wimax 16e frame is aligned with an initial location of a half frame of the LTE frame (initial locations of 0# and 5# subframes of the LTE frame), shift time is set as 0, and not all the types of the downlink resources of the Wimax 16e frame are the PUSCs.

It can be determined according to the calculation method in embodiment two that the configured numbers of downlink symbols and uplink symbols in the Wimax 16e frame are related to the frame configuration of a particular subframe and cyclic prefix type of the LTE frame, and the corresponding relationship is shown in table 3:

TABLE 3

| Frame configuration of a particular subframe of the LTE | Maximum number of the downlink symbols in the Wimax 16e frame | | Maximum number of the uplink symbols in the Wimax 16e frame | |
|---|---|---|---|---|
| | A regular cyclic prefix for the downlink of the LTE | An extended cyclic prefix for the downlink of the LTE | A regular cyclic prefix for the downlink of the LTE | An extended cyclic prefix for the downlink of the LTE |
| 0 | 11 | 12 | 29 | 29 |
| 1 | 15 | 16 | 29 | 29 |
| 2 | 16 | 17 | 29 | 29 |
| 3 | 17 | 17 | 29 | 29 |
| 4 | 18 | 12 | 29 | 30 |
| 5 | 11 | 16 | 30 | 30 |
| 6 | 15 | 17 | 30 | 30 |
| 7 | 16 | — | 30 | — |
| 8 | 17 | — | 30 | — |

In FIG. 5, x represents a number of downlink symbols in the Wimax 16e frame, which may be 11-18 corresponding to values of table 3, y in the figure represents a number of uplink symbols in the Wimax 16e frame, which may be 29 or 30 corresponding to values of table 3. The meanings of x and y in the following embodiments are similar as those in the present embodiment, and will not be described further.

EXAMPLE TWO

In the present example, the LTE base station uses 1# uplink and downlink configuration, an uplink and downlink subframe sequence in the LTE frame is DSUUDDSUUD, and structures of two half frames are the same. As shown in FIG. 6, an initial location of the Wimax 16e frame is aligned with an initial location of the fifth subframe of a half frame of the LTE frame (initial locations of 4# and 9# subframes of the LTE frame), forward shift time is set as 1 ms, and not all the types of the downlink resources of the Wimax 16e frame are the PUSCs.

It can be determined according to the calculation method in embodiment two that the configured maximum values of numbers of downlink symbols and uplink symbols in the Wimax 16e frame and the frame configuration of a particular subframe and cyclic prefix type of the LTE frame have a corresponding relationship shown in table 4:

TABLE 4

| Frame configuration of a particular subframe of the LTE | Maximum number of the downlink symbols in the Wimax 16e frame | | Maximum number of the uplink symbols in the Wimax 16e frame | |
|---|---|---|---|---|
| | A regular cyclic prefix for the downlink of the LTE | An extended cyclic prefix for the downlink of the LTE | A regular cyclic prefix for the downlink of the LTE | An extended cyclic prefix for the downlink of the LTE |
| 0 | 21 | 21 | 19 | 19 |
| 1 | 25 | 25 | 19 | 19 |
| 2 | 26 | 26 | 19 | 19 |
| 3 | 27 | 27 | 19 | 19 |
| 4 | 27 | 21 | 19 | 20 |
| 5 | 21 | 25 | 20 | 20 |
| 6 | 25 | 26 | 20 | 20 |
| 7 | 26 | — | 20 | — |
| 8 | 27 | — | 20 | — |

EXAMPLE THREE

Figure 7:
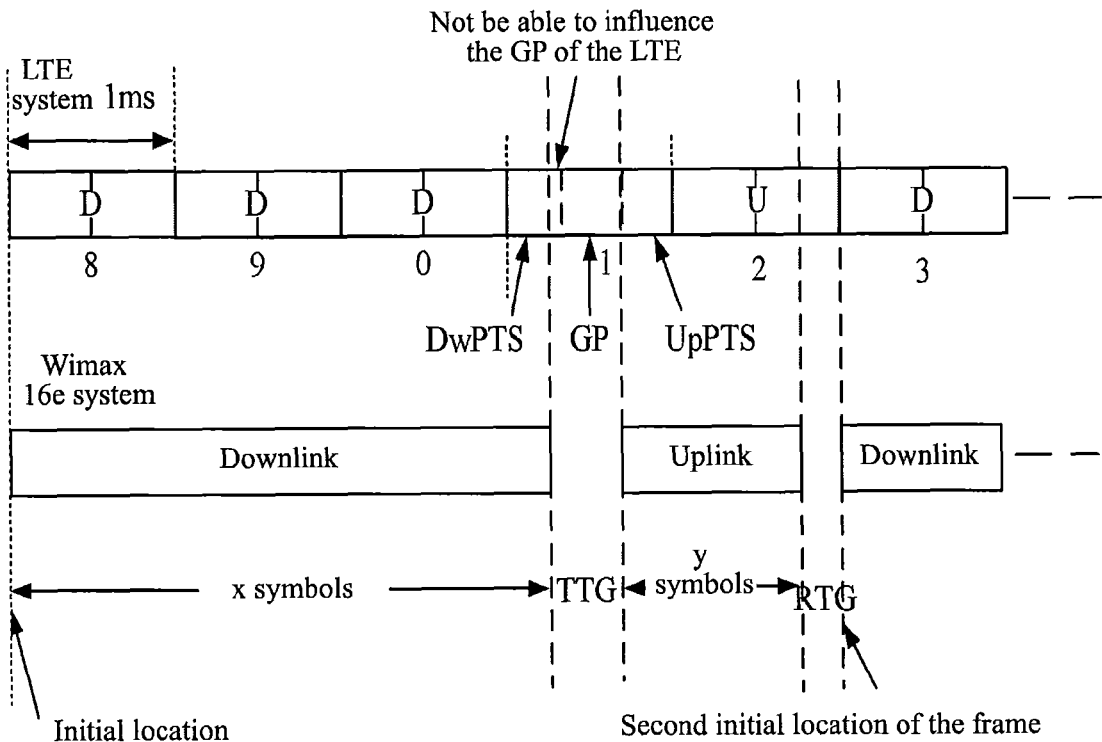
FIG. 7 is a diagram of frame configurations of two systems when a LTE base station and a Wimax 16e base station are of adjacent frequency coexistence and use 2# uplink and downlink configuration according to example three of embodiment two.

In the present example, the LTE base station uses 2# uplink and downlink configuration, and an uplink and downlink subframe sequence in the LTE frame is DSUUDDSUUD, and structures of two half frames are the same. As shown in FIG. 7, an initial location of the Wimax 16e frame is aligned with an initial location of the fourth subframe of a half frame of the LTE frame (initial locations of 3# and 8# subframes of the LTE frame), forward shift time is set as 2 ms, and not all the types of the downlink resources of the Wimax 16e frame are the PUSCs.

It can be determined according to a calculation method in embodiment two that the configured maximum values of numbers of downlink symbols and uplink symbols in the Wimax 16e frame and the frame configuration of a particular subframe and cyclic prefix type of the LTE frame have a corresponding relationship shown in table 5:

TABLE 5

| Frame configuration of a particular subframe of the LTE | Maximum number of the downlink symbols in the Wimax 16e frame | | Maximum number of the uplink symbols in the Wimax 16e frame | |
|---|---|---|---|---|
| | A regular cyclic prefix for the downlink of the LTE | An extended cyclic prefix is for the downlink of the LTE | A regular cyclic prefix for the downlink of the LTE | An extended cyclic prefix is for the downlink of the LTE |
| 0 | 31 | 31 | 10 | 10 |
| 1 | 35 | 35 | 10 | 10 |
| 2 | 36 | 36 | 10 | 10 |
| 3 | 36 | 37 | 10 | 10 |
| 4 | 37 | 31 | 10 | 10 |
| 5 | 31 | 36 | 10 | 10 |
| 6 | 35 | 36 | 10 | 10 |
| 7 | 36 | — | 10 | — |
| 8 | 36 | — | 10 | — |

EXAMPLE FOUR

Figure 8:
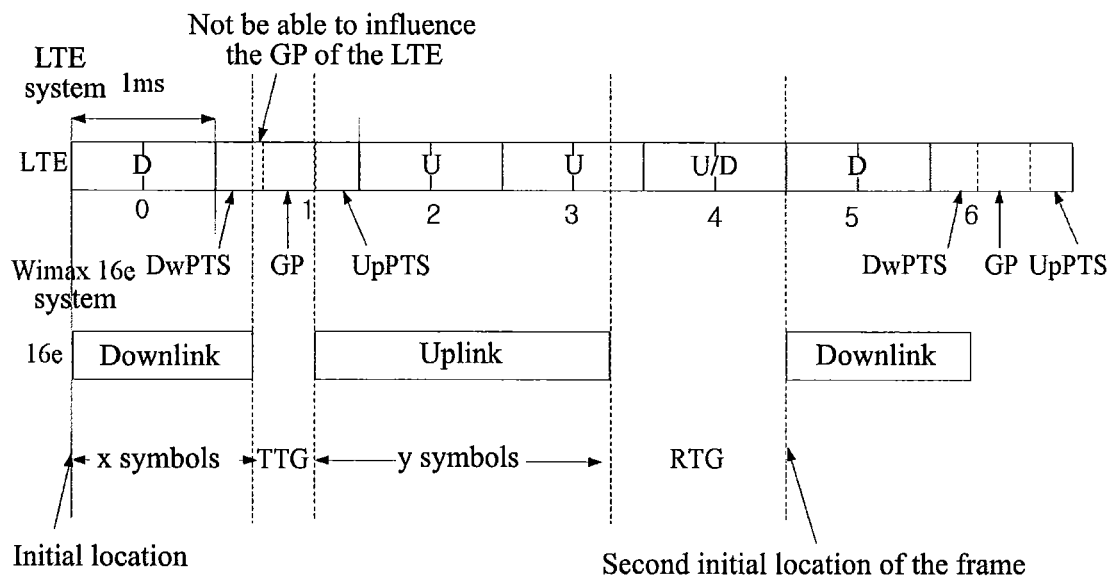
FIG. 8 is a diagram of frame configurations of two systems when a LTE base station and a Wimax 16e base station are of adjacent frequency coexistence and use 6# uplink and downlink configuration according to example four of embodiment two.

In the present example, the LTE base station uses 6# uplink and downlink configuration, and an uplink and downlink subframe sequences in the LTE frame is DSUUUDSUUD, and structures of two half frames are the same. As shown in FIG. 8, shift time at this time is considered according to configuration parameters of the first half frame, an initial location of the Wimax 16e frame is aligned with an initial location of a half frame of the LTE frame (initial locations of 0# and 5# subframes of the LTE frame) and the shift time is set as 0. Not all the types of the downlink resources of the Wimax 16e frame are the PUSCs.

It can be determined according to a calculation method in embodiment two that the configured maximum values of numbers of downlink symbols and uplink symbols in the Wimax 16e frame and the frame configuration of a particular subframe and cyclic prefix type of the LTE frame have a corresponding relationship shown in table 6:

TABLE 6

| Frame configuration of a particular subframe of the LTE | Maximum number of the downlink symbols in the Wimax 16e frame | | Maximum number of the uplink symbols in the Wimax 16e frame | |
|---|---|---|---|---|
| | A regular cyclic prefix for the downlink of the LTE | An extended cyclic prefix is for the downlink of the LTE | A regular cyclic prefix for the downlink of the LTE | An extended cyclic prefix is for the downlink of the LTE |
| 0 | 11 | 12 | 19 | 19 |
| 1 | 15 | 16 | 19 | 19 |
| 2 | 16 | 17 | 19 | 19 |
| 3 | 17 | 17 | 19 | 19 |
| 4 | 18 | 12 | 19 | 20 |
| 5 | 11 | 16 | 20 | 20 |
| 6 | 15 | 17 | 20 | 20 |
| 7 | 16 | — | 20 | — |
| 8 | 17 | — | 20 | — |

The values of the numbers of the uplink and downlink symbols in the Wimax 16e in tables 3-6 of the above examples one to four are the maximum values, and are also preferable values, but in actual implementation, the numbers of the uplink and downlink symbols in the same line in tables 3-6 do not necessarily be satisfied at the same time, and it is also permissible if only one is satisfied. For example, for table 5, when the frame configuration of the particular subframe is $0^{th}$ configuration, the value of the number of the uplink symbols in the Wimax 16e can be 31, the value of the number of the downlink symbols is not necessarily 10, which can also be less than 10, vice versa. Both the configured numbers of the uplink symbols and downlink symbols can be less than the values in the tables.

It can be seen from the above description that the present invention achieves the following technical effect: the above embodiments consider the problem of adjacent frequency systems interfering with each other due to adjacent frequency bandwidth leakage, solve the problem of interfering with each other, guarantee that the terminal can normally communicate with the base station, and ensure frequency efficiency of the wireless communication system using the method of increasing or reducing uplink time and/or downlink time of a certain communication system. Meanwhile, when the uplink and downlink configuration of one system is changed, the configuration of another system can also be adjusted correspondingly, so that the two systems remain in a state with less interference.

Obviously, those skilled in the art should understand that the above various modules or various steps of the present invention can be implemented by general computing apparatuses, which can be integrated on a single computing apparatus, or distributed across a network comprised of multiple computing apparatuses, alternatively, can be implemented by computer codes which are executable by the computing apparatuses, thus being stored on a storage apparatus for execution by the computing apparatuses, and in some cases, the steps illustrated or described can be performed in an order different from that here, or be implemented by making the steps into various integrated circuit modules, or making multiple modules or steps therein into a single integrated circuit module. Thus, the present invention is not limited to any particular form of a combination of hardware and software.

The above description is only the preferred embodiments of the present invention and is not intended to limit the present invention. The invention can have a variety of changes and variations for those skilled in the art. Any modification, equivalent substitution, improvement etc. which are made within the spirit and principle of the present invention should belong to the protection scope of the present invention.

Industrial Applicability

Compared to the related technologies, in the present invention, the problem of mutual interference when there is adjacent frequency coexistence of the LTE system and the Wimax 16e system is solved, and the performance of the communication system is enhanced, thus achieving reliable communication between the communication systems.

What is claimed is:

1. A method for configuring physical resource when communication systems coexist, wherein, the method is applied to a situation of adjacent frequency coexistence of a Worldwide Interoperability for Microwave Access (Wimax) system and a Long Term Evolution (LTE) system, and both systems using a Time Division Duplex (TDD) mode, comprising:
configuring physical resources of a Wimax 16e frame according to configuration information of a LTE frame by the following modes:
configuring a number of downlink symbols in the Wimax 16e frame and shift time of an initial location of the Wimax 16e frame relative to an initial location of a half frame of the LTE frame according to a constraint condition that a downlink area of the Wimax 16e frame is included in a downlink area of the LTE frame in a time domain;
configuring a number of uplink symbols and a time length of a Transmission/Receive Transition Gap (TTG) in the Wimax 16e frame according to a constraint condition that an uplink area of the Wimax 16e frame is included in an uplink area of the LTE frame in the time domain,
wherein, a handover period of the LTE frame is 5 ms;
wherein, the step of configuring shift time of an initial location of the Wimax 16e frame relative to an initial location of a half frame of the LTE frame comprises:
when a number of downlink subframes in a first half frame of the LTE frame N≥2, configuring the shift time as (N−1)ms using a forward shift mode; alternatively, configuring the shift time as (6−N)ms using a backward shift mode;
when N=1, configuring the shift time as 0.

2. The method for configuring physical resource according to claim 1, wherein, the step of configuring the time length of the TTG comprises:
configuring the time length of the TTG as a difference value obtained by subtracting a time length of the downlink area of the Wimax 16e frame from a total time length of all the downlink subframes, a Downlink Pilot Time Slot (DwPTS) and a Guard Period (GP) in the first half frame of the LTE frame, so that an initial location of an uplink area of the Wimax 16e frame is aligned with an initial location of an Uplink Pilot Time Slot (UpPTS) in the half frame of the LTE frame.

3. The method for configuring physical resource according to claim 2, wherein,
when not all the downlink resources of the Wimax 16e frame are Partial Usage of Sub-Channels (PUSCs), the configured number of the downlink symbols in the Wimax 16e frame is less than or equal to a maximum integer satisfying a first condition, and when all the downlink resources of the Wimax 16e frame are the PUSCs, the configured number of the downlink symbols in the Wimax 16e frame is less than or equal to a maximum odd number satisfying the first condition;
when not all the uplink resources of the Wimax 16e frame are the PUSCs, the configured number of the uplink symbols in the Wimax 16e frame is less than or equal to a maximum integer satisfying a second condition, and when all the uplink resources of the Wimax 16e frame are the PUSCs, the configured number of the uplink symbols in the Wimax 16e frame is less than or equal to a maximum integer satisfying the second condition and being a multiple of 3, wherein,
the first condition is that a total time length of all the downlink symbols in the Wimax 16e frame is less than or equal to a time length of the downlink area of the first half frame of the LTE frame; and the second condition is that a sum of a total time length of all the uplink symbols in the Wimax 16e frame and a minimum time length of a Receive/Transmission Transition Gap (RTG) is less than or equal to a time length of an uplink area of a second half frame of the LTE frame.

4. The method for configuring physical resource according to claim 3, wherein, when the LTE frame uses a 0# uplink and downlink configuration and not all the downlink resources of the Wimax 16e frame are the PUSCs,
a corresponding relationship between maximum values of the configured numbers of the downlink symbols and the uplink symbols in the Wimax 16e frame and a frame configuration of a particular subframe of the LTE frame as well as a cyclic prefix type is as follows:

|  | Maximum numbers of the downlink symbols in the Wimax 16e frame | | Maximum numbers of the uplink symbols in the Wimax 16e frame | |
| --- | --- | --- | --- | --- |
| Frame configurations of a particular subframe of the LTE | A regular cyclic prefix is for the downlink of the LTE | An extended cyclic prefix is for the downlink of the LTE | A regular cyclic prefix is for the downlink of the LTE | An extended cyclic prefix is for the downlink of the LTE |
| 0 | 11 | 12 | 29 | 29 |
| 1 | 15 | 16 | 29 | 29 |
| 2 | 16 | 17 | 29 | 29 |
| 3 | 17 | 17 | 29 | 29 |
| 4 | 18 | 12 | 29 | 30 |
| 5 | 11 | 16 | 30 | 30 |
| 6 | 15 | 17 | 30 | 30 |
| 7 | 16 | — | 30 | — |
| 8 | 17 | — | 30 | —. |

5. The method for configuring physical resource according to claim 2, wherein, when the LTE frame uses a 1# uplink and downlink configuration and not all the downlink resources of the Wimax 16e frame are the PUSCs, a corresponding relationship between maximum values of the configured numbers of the downlink symbols and the uplink symbols in the Wimax 16e frame and a frame configuration of a particular subframe of the LTE frame as well as a cyclic prefix type is as follows:

|  | Maximum numbers of the downlink symbols in the Wimax 16e frame | | Maximum numbers of the uplink symbols in the Wimax 16e frame | |
| --- | --- | --- | --- | --- |
| Frame configurations of a particular subframe of the LTE | A regular cyclic prefix is for the downlink of the LTE | An extended cyclic prefix is for the downlink of the LTE | A regular cyclic prefix is for the downlink of the LTE | An extended cyclic prefix is for the downlink of the LTE |
| 0 | 21 | 21 | 19 | 19 |
| 1 | 25 | 25 | 19 | 19 |
| 2 | 26 | 26 | 19 | 19 |
| 3 | 27 | 27 | 19 | 19 |
| 4 | 27 | 21 | 19 | 20 |
| 5 | 21 | 25 | 20 | 20 |
| 6 | 25 | 26 | 20 | 20 |
| 7 | 26 | — | 20 | — |
| 8 | 27 | — | 20 | —. |

6. The method for configuring physical resource according to claim 2, wherein, when the LTE frame uses a 2# uplink and downlink configuration and not all the downlink resources of the Wimax 16e frame are the PUSCs, a corresponding relationship between maximum values of the configured number of the downlink symbols and the uplink symbols in the Wimax 16e frame and a frame configuration of a particular subframe of the LTE frame as well as a cyclic prefix type is as follows:

|  | Maximum numbers of the downlink symbols in the Wimax 16e frame | | Maximum numbers of the uplink symbols in the Wimax 16e frame | |
| --- | --- | --- | --- | --- |
| Frame configurations of a particular subframe of the LTE | A regular cyclic prefix is for the downlink of the LTE | An extended cyclic prefix is for the downlink of the LTE | A regular cyclic prefix is for the downlink of the LTE | An extended cyclic prefix is for the downlink of the LTE |
| 0 | 31 | 31 | 10 | 10 |
| 1 | 35 | 35 | 10 | 10 |
| 2 | 36 | 36 | 10 | 10 |
| 3 | 36 | 37 | 10 | 10 |
| 4 | 37 | 31 | 10 | 10 |
| 5 | 31 | 36 | 10 | 10 |
| 6 | 35 | 36 | 10 | 10 |
| 7 | 36 | — | 10 | — |
| 8 | 36 | — | 10 | —. |

7. The method for configuring physical resource according to claim 2, wherein, when the LTE frame uses a 6# uplink and downlink configuration and not all the downlink resources of the Wimax 16e frame are the PUSCs, a corresponding relationship between maximum values of the configured number of the downlink symbols and the uplink symbols in the Wimax 16e frame and a frame configuration of a particular subframe of the LTE frame as well as a cyclic prefix type is as follows:

|  | Maximum numbers of the downlink symbols in the Wimax 16e frame | | Maximum numbers of the uplink symbols in the Wimax 16e frame | |
| --- | --- | --- | --- | --- |
| Frame configurations of a particular subframe of the LTE | A regular cyclic prefix is for the downlink of the LTE | An extended cyclic prefix is for the downlink of the LTE | A regular cyclic prefix is for the downlink of the LTE | An extended cyclic prefix is for the downlink of the LTE |
| 0 | 11 | 12 | 19 | 19 |
| 1 | 15 | 16 | 19 | 19 |
| 2 | 16 | 17 | 19 | 19 |
| 3 | 17 | 17 | 19 | 19 |
| 4 | 18 | 12 | 19 | 20 |
| 5 | 11 | 16 | 20 | 20 |
| 6 | 15 | 17 | 20 | 20 |
| 7 | 16 | — | 20 | — |
| 8 | 17 | — | 20 | —. |

8. The method for configuring physical resource according to claim 1, wherein, the step of configuring the physical resources of the Wimax 16e according to the configuration information of the LTE frame comprises: a Wimax 16e base station configuring the physical resources of the Wimax 16e frame of this Wimax 16e base station according to uplink and downlink configuration information, frame configuration information of a particular subframe and cyclic prefix type information of the LTE frame of a LTE base station which is of adjacent frequency coexistence with the Wimax 16e base station;

wherein, a configuration of the physical resources of the Wimax 16e frame is a static configuration or a non-static configuration; and the method further comprises: when the configuration of the physical resources of the Wimax 16e frame is the non-static configuration, the LTE base station transmitting new configuration information of a LTE frame to be effective to the Wimax 16e base station after the LTE base station updating the configuration of the LTE frame, and the Wimax 16e base station reconfiguring the physical resources of the Wimax 16e frame of the local base station according to the new configuration information of the LTE frame.

9. A method for signal transmission when communication systems coexist, wherein, this method is applied to a situation of adjacent frequency coexistence of a World-wide Interoperability for Microwave Access (Wimax) 16e base station and a Long Term Evolution (LTE) base station and both base stations using a Time Division Duplex (TDD) mode, and the method comprises:

the Wimax 16e base station transmitting a downlink signal on a downlink area of a Wimax 16e frame, and transmitting an uplink signal on an uplink area of the Wimax 16e frame;

the downlink area of the Wimax 16e frame being included in a downlink area of a LTE frame in a time domain, and the uplink area of the Wimax 16e frame being included in an uplink area of the LTE frame in the time domain, wherein, an uplink and downlink handover period of the LTE frame is 5 ms;

wherein, the Wimax 16e base station is clock synchronized with the LTE base station;

when a number of downlink subframes in a first half frame of the LTE frame N≥2, a starting time for the Wimax 16e base station to transmit the downlink signal on the downlink area of the Wimax 16e frame is aligned with a starting time of a second downlink subframe in a half frame of the LTE frame; and when N=1, the starting time for the Wimax 16e base station to transmit the downlink signal on the downlink area of the Wimax 16e frame is aligned with a starting time of a half frame of the LTE frame;

the starting time for the Wimax 16e base station to transmit the uplink signal on the uplink area of the Wimax 16e frame is aligned with a starting time of an Uplink Pilot Time Slot (UpPTS) in the half frame of the LTE frame.

10. The method for signal transmission according to claim 9, wherein, the step of the Wimax 16e base station transmitting a downlink signal on a downlink area of a Wimax 16e frame comprises: the Wimax 16e base station transmitting a first synchronization signal on a first downlink symbol of the Wimax 16e frame, transmitting a system control signaling starting from a second downlink symbol, and transmitting a second synchronization signal on a downlink symbol with a starting time being 5ms later than starting time of the first downlink symbol.

11. The method for signal transmission according to claim 9, wherein, when the LTE frame uses a 0# uplink and downlink configuration, a maximum number of downlink symbols which can be used by the downlink area and a maximum number of uplink symbols which can be used by the uplink area of the Wimax 16e frame are obtained according to the table in the method for configuring physical resource according to claim 4;

when the LTE frame uses a 1# uplink and downlink configuration, a maximum number of downlink symbols which can be used by the downlink area and a maximum number of uplink symbols which can be used by the uplink area of the Wimax 16e frame are obtained according to the table in the method for physical resource configuration according to claim 5;

when the LTE frame uses a 2# uplink and downlink configuration, a maximum number of downlink symbols which can be used by the downlink area and a maximum number of uplink symbols which can be used by the uplink area of the Wimax 16e frame are obtained according to the table in the method for physical resource configuration according to claim 6; and when the LTE frame uses a 6# uplink and downlink configuration, a maximum number of downlink symbols which can be used by the downlink area and a maximum number of uplink symbols which can be used by the uplink area of the Wimax 16e frame are obtained according to the table in the method for physical resource configuration according to claim 7.

12. A base station, wherein, the base station is applied to Wimax 16e, the base station and a Long Term Evolution (LTE) base station are of adjacent frequency coexistence and both base stations use a Time Division Duplex (TDD) mode, an uplink and downlink handover period of a LTE frame configured by the LTE base station is 5 ms, and the base station comprises a processor and a storage device storing processor-executable programs, and the programs comprises:

a first configuration apparatus, configured to configure a number of downlink symbols in a Wimax 16e frame and shift time of an initial location of the Wimax 16e frame relative to an initial location of a half frame of the LTE frame according to a constraint condition that a downlink area of the Wimax 16e frame is included in a downlink area of the LTE frame in a time domain;

a second configuration apparatus, configured to configure a number of uplink symbols and a time length of a Transmission/Receive Transition Gap (TTG) in the Wimax 16e frame according to a constraint condition that an uplink area of the Wimax 16e frame is included in an uplink area of the LTE frame in the time domain;

wherein, the first configuration apparatus comprises: a shift configuration apparatus, configured to configure shift time of an initial location of the Wimax 16e frame relative to an initial location of a half frame of a LTE frame by the following modes: when a number of downlink subframes in a first half frame of the LTE frame N≥2, configuring the shift time as (N−1)ms using a forward shift mode; alternatively, configuring the shift time as (6−N)ms using a backward shift mode; and when N=1, configuring the shift time as 0.

13. The base station according to claim 12, wherein, the first configuration apparatus further comprises:

a downlink resource configuration apparatus, configured to configure the number of the downlink symbols in the Wimax 16e frame, wherein, when not all the downlink resources of the Wimax 16e frame are Partial Usage of Sub-Channels (PUSCs), the configured number of the downlink symbols in the Wimax 16e frame is less than or equal to a maximum integer satisfying a first condition, and when all the downlink resources of the Wimax 16e frame are the PUSCs, the configured number of the downlink symbols in the Wimax 16e frame is less than or equal to a maximum odd number satisfying the first condition, wherein, the first condition is that a total time length of all the downlink symbols in the Wimax 16e frame is less than or equal to a time length of the downlink area of the first half frame of the LTE frame.

14. The base station according to claim 13, wherein, the second configuration apparatus comprises:

a TTG time length configuration apparatus, configured to configure the time length of the TTG in the Wimax 16e frame by the following modes: configuring the time length of the TTG as a difference value obtained by subtracting the time length of the downlink area of the Wimax 16e frame from a total time length of all the downlink subframes, a Downlink Pilot Time Slot (DwPTS) and a Guard Period (GP) in the first half frame of the LTE frame;

an uplink resource configuration apparatus, configured to configure the number of the uplink symbols in the Wimax 16e frame, wherein, when not all the uplink resources of the Wimax 16e frame are the PUSCs, the configured number of the uplink symbols in the Wimax 16e frame is less than or equal to a maximum integer satisfying a second condition, and when all the uplink resources of the Wimax 16e frame are the PUSCs, the configured number of the uplink symbols in the Wimax 16e frame is less than or equal to a maximum integer satisfying the second condition and being a multiple of 3, wherein, the second condition is that a sum of the total time length of all the uplink symbols in the Wimax 16e frame and a minimum time length of a Receive/Transmission Transition Gap (RTG) is less than or equal to the time length of the uplink area of a second half frame of the LTE frame.

15. The base station according to claim 12, wherein, the second configuration apparatus comprises:

a TTG time length configuration apparatus, configured to configure the time length of the TTG in the Wimax 16e frame by the following modes: configuring the time length of the TTG as a difference value obtained by subtracting the time length of the downlink area of the Wimax 16e frame from a total time length of all the downlink subframes, a Downlink Pilot Time Slot (DwPTS) and a Guard Period (GP) in the first half frame of the LTE frame;

an uplink resource configuration apparatus, configured to configure the number of the uplink symbols in the Wimax 16e frame, wherein, when not all the uplink resources of the Wimax 16e frame are the PUSCs, the configured number of the uplink symbols in the Wimax 16e frame is less than or equal to a maximum integer satisfying a second condition, and when all the uplink resources of the Wimax 16e frame are the PUSCs, the configured number of the uplink symbols in the Wimax 16e frame is less than or equal to a maximum integer satisfying the second condition and being a multiple of 3, wherein, the second condition is that a sum of the total time length of all the uplink symbols in the Wimax 16e frame and a minimum time length of a Receive/Transmission Transition Gap (RTG) is less than or equal to the time length of the uplink area of a second half frame of the LTE frame.

16. The base station according to claim 12, wherein, the first configuration apparatus and the second configuration apparatus are configured to configure the physical resources of the Wimax 16e frame of the base station according to uplink and downlink configuration information, frame configuration information of a particular subframe and cyclic prefix type information of the LTE frame of a LTE base station which is of adjacent frequency coexistence with the base station;

the base station further comprises: a frame configuration update apparatus, configured to receive new configuration information of a LTE frame to be effective of the LTE base station after the LTE base station updates the configuration of the LTE frame, and notify the first configuration apparatus and the second configuration apparatus, so that the first configuration apparatus and the second configuration apparatus reconfigure the physical resources of the Wimax 16e frame according to the new configuration information of the LTE frame.

* * * * *

UNITED STATES PATENT AND TRADEMARK OFFICE
CERTIFICATE OF CORRECTION

PATENT NO.         : 9,191,825 B2                                       Page 1 of 1
APPLICATION NO.    : 13/639023
DATED              : November 17, 2015
INVENTOR(S)        : Ding Ning, Yanfeng Guan and Huiying Fang It is certified that error appears in the above-identified patent and that said Letters Patent is hereby corrected as shown below:

Claims

Claim 4, Column 18, Line 60, "3" should read as -- 2 --

Claim 14, Column 22, line 61, "13" should read as -- 12 --

Claim 15, Column 23, Line 22, "12" should read as -- 13 --

Signed and Sealed this
Fifth Day of April, 2016

Michelle K. Lee
*Director of the United States Patent and Trademark Office*